May 9, 1967  R. E. DUFF  3,318,144
SUPERSONIC TEST FACILITY
Filed Aug. 7, 1964  2 Sheets-Sheet 1
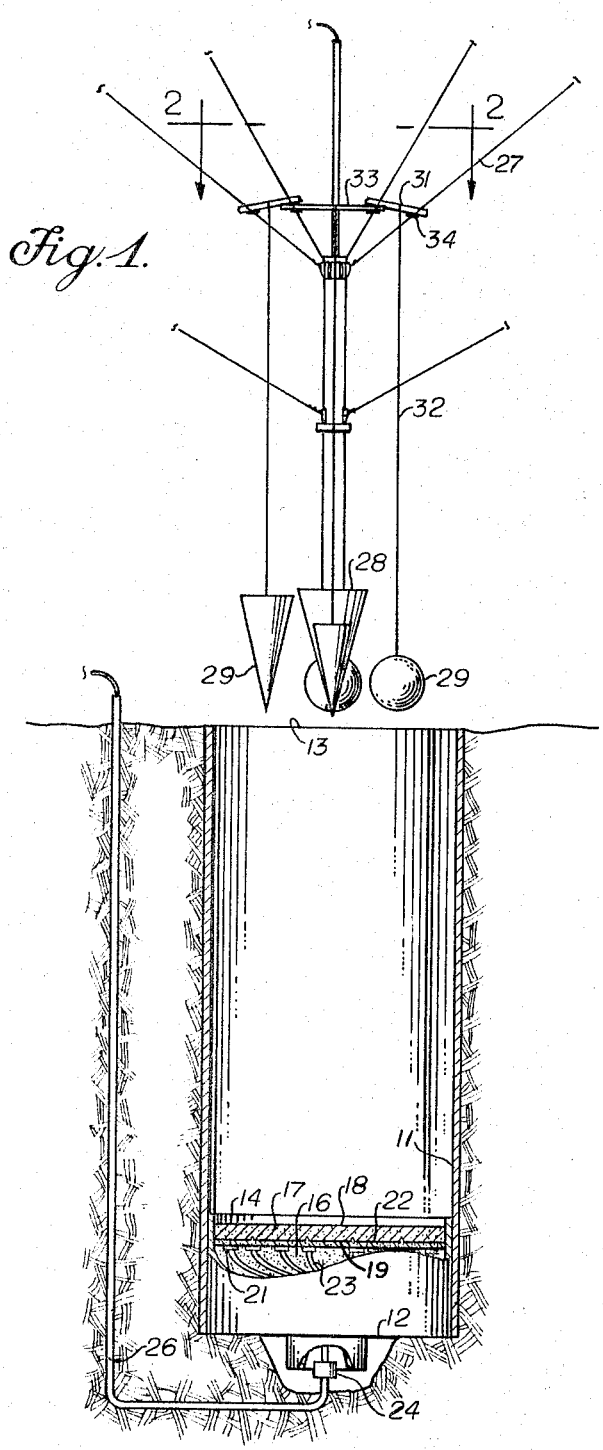
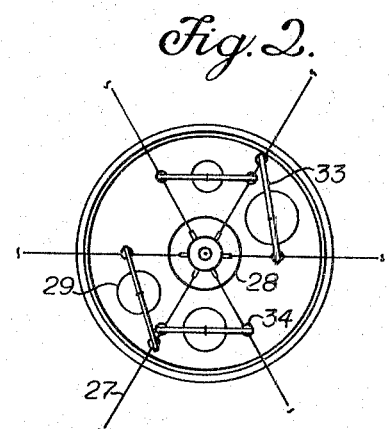
INVENTOR.
RUSSELL E. DUFF
BY
ATTORNEY

INVENTOR.
RUSSELL E. DUFF

ATTORNEY

United States Patent Office 3,318,144
Patented May 9, 1967

3,318,144
SUPERSONIC TEST FACILITY
Russell E. Duff, Livermore, Calif., assignor to the United States of America as represented by the United States Atomic Energy Commission
Filed Aug. 7, 1964, Ser. No. 388,335
3 Claims. (Cl. 73—147)

The invention disclosed herein was made in the course of, or under, Contract W-7405-ENG-48 with the United States Atomic Energy Commission.

This invention relates to supersonic test facilities and especially to a method and a test facility for generating supersonic flow by high explosive. More particularly, it relates to a test facility employing a high explosive to generate at high pressure an esesntially one dimensional supersonic flow of air and explosion products.

A recent technological problem is the survivability of nuclear warheads to countermeasure attack. A prerequisite to experimental investigations of the structural problems involved is the devepoment of an appropriate test facility. It must be capable of generating flows similar in pressure and duration to those produced by high altitude nuclear explosion. It has been determined that high explosives can be used to generate such a flow.

In the past explosives have been employed to investigate blast waves, an example is the cone-shaped cavity utilized in experiments conducted by the U.S. Navy described in the Physics of Fluids Journal, May–June 1960, "Measurements on a Blast Wave in a Conical Tube," by William S. Filler. In those experiments an explosive was detonated at the apex of a conical tube to simulate blast waves in air. The shock wave generated was a three dimensional, expanding, relatively weak shock wave. The test facility was a reusable structure having a 42 inch cone, 18 inches maximum diameter, with the detenation contained in a 5 inch steel billet at the apex. A typical charge for generating the blast waves was energetically equal to ½-gram of TNT. The measured peak pressures were less than 100 p.s.i. The studies were made on shocked air to investigate blast wave characteristics. The facility was relatively expensive and not suitable for investigating other conditions resulting from an explosion than the three dimensional, expanding, relatively weak, air shock waves.

The Navy test facility could not be used for the investigations of the present invention because it was not designed to produce one-dimensional, high pressure, relatively long duration, supersonic flow. Accordingly, these exists a need for an inexpensive blast simulator which is simple to construct, and which produces a high pressure, approximately 10,000 p.s.i., supersonic flow on the order of a millisecond duration.

The present invention satisfies the foregoing required needs by providing inexpensive supersonic wind tunnels, capable of producing high free stream dynamic pressure for relatively long durations. The prior art is not capable of doing this. In brief, the method for generating the high-pressure, relatively long-duration, supersonic flow comprises detonating a high explosive to generate a planar shock wave and zone of gaseous detonation reaction products traveling at a supersonic speed which can be directed against a test object. The shock wave and associated air flow makes a relatively small contribution to the test. The method of the present invention is accomplished by utilizing a reinforced cavity of predetermined dimensions and providing a unidirectional flow path along which said detonation products are directed. Briefly, a high explosive is arranged uniformly across a closed end of such cavity and upon detonation generates a substantially planar supersonic flow of detonation reaction products proceeding along said path to the open end of said cavity. Means are employed for exposing at least one test object to the supersonic flow in proximity to the open end of the cavity. The test objects may be instrumented to record the effects produced by the supersonic explosion product flow. Simple recovery of the test objects with post mortem investigation also yields significant data.

The explosion produces a shock wave in air which precedes the reaction product flow. However, the air flow produced by this shock wave becomes mixed with explosion products and, to a large extent, loses its identity.

It is therefore an important object of the present invention to provide an improved method for generating a supersonic gaseous material flow.

Another object of the invention is to provide an inexpensive and expendable supersonic gas flow facility which can be modified to produce different flow conditions.

Yet another object of the invention is to provide a method which will produce relatively high pressure, long duration supersonic gaseous material flow.

Further objects of the invention will become apparent from the following description and accompanying drawing.

FIGURE 1 depicts a supersonic test facility in accord with the invention, partly in elevation and partly in longitudinal section readied for operation.

FIGURE 2 is a plan view of the test facility illustrated in FIGURE 1.

Figure 3:
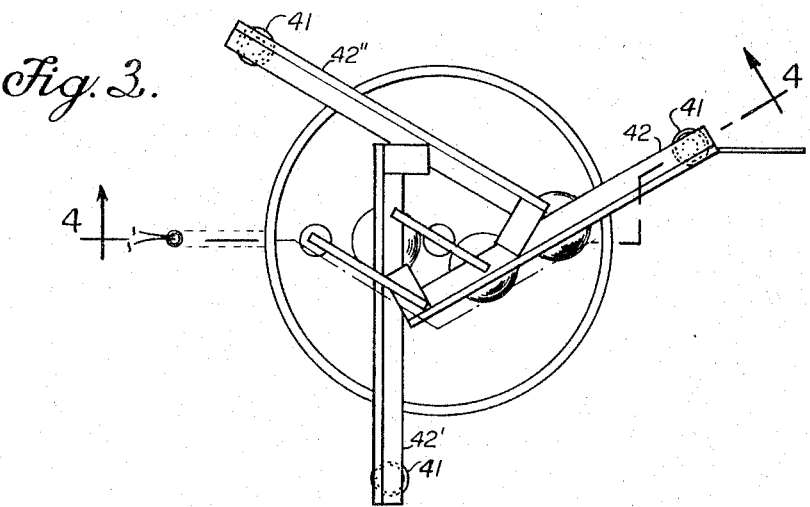
FIGURE 3 is a plan view of an alternative embodiment of the invention.
Figure 4:
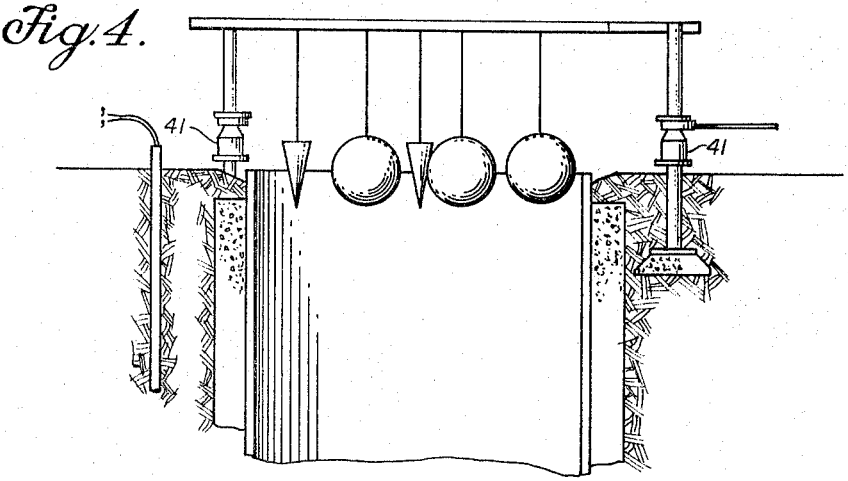
FIGURE 4 is an elevation view of the test facility of FIGURE 3, taken along section line 4—4, to show the disposition of the test objects with respect to the end of the explosive container.

Briefly, in operating the process of the invention to confine and direct the supersonic gaseous flow, there is employed a structure defining an elongated cavity, which structure may be constructed to provide inertial effects sufficient to approximately maintain the configuration of the cavity during at least the test period. Ordinarily, a substantially uniform diameter, cylindrical configuration will suffice. An explosive assembly is disposed at one end of said cavity. The assembly is designed to generate a substantially transverse, planar detonation therein which drives a flow which is directed to emerge from the opposite end of said cavity. The flow will be preceded by a shock front of microsecond or less duration which emerges first to be followed by a sustained, in the millisecond range, directed flow of the air that was in the cavity and the mass of gaseous reaction products of the explosive. An explosion assembly for producing this flow will generally comprise high explosive distributed across the diameter of said cavity and means including detonators for initiating a transverse planar detonation in said high explosive. A lens system may be used if it is desired to obtain improved simultaneity of ignition. Tamping means or other closure may be utilized behind the explosive assembly to maximize the flow through the cavity.

Preferably in the method of the present invention, test objects are suspended in breakaway relation in proximity to the end of the cavity distal from the explosive. The objects may or may not be instrumented to sense a selected reaction of the object to the supersonic flow. In response to the incident supersonic flow, the sensing instruments may generate a predetermined signal characteristic of the reaction. The generated signal is directed by appropriate transmission means to a recorder where the signal is recorded for analysis.

In some instances it is desired to measure the free flight trajectory of an object in reaction to the supersonic flow. In those cases, the test object is suspended in breakaway relation with a suitable support structure. The object is projected into free flight by the incident directed supersonic flow. The trajectory of the object is tracked by methods such as a visual observation.

Preferred apparatus for conducting the method of the present invention is illustrated in FIGURES 1 and 2 wherein such apparatus is constructed as an earth emplaced facility for generating a supersonic flow employed to test the reaction of various object configurations to such a flow.

More specifically, the apparatus includes a cylindrical steel liner 11 disposed within and to line a vertical hole bored in earth or rock with such material providing inertial tamping. Liners have been used which have varied from 2 to 10 feet in diameter and from 10 to 50 feet long in size. The liner 11 has a bottom end 12 and an open upper end 13 the latter of which is made approximately level with the surface of the earth. The linear may usually be vertically oriented but any orientation can be utilized such as horizontal positioning which has been used in actual practice. The liner should be of a ductile material such as mild steel which may be enlarged by explosive pressure without shattering.

An explosive assembly for generating the desired detonation is provided with an open-top container 14 disposed in the lower portion of linear 11, preferably, close to the bottom end 12. Container 14 is partially filled with sand 16 and a uniform layer of high explosive 17, e.g., TNT, having a planar upper surface 18 and a lower surface 19 positioned atop sand 16.

A detonating means is utilized to ignite the explosive 17 essentially uniformly across the lower surface 19 of the explosive. For example, in practice an array of booster pellets 21 of Tetryl were arranged on top of sand 16 on 8-inch triangular centers. One-half inch of PBX–9404 explosive 22 was interposed between TNT high explosive 17 and the booster pellets 21. The layer of PBX can be omitted since a series of individual detonators with larger booster pellets would serve equally well. The booster pellets 21 were initiated by a system of primacord trains 23 originating at a P–040 detonating lens 24. Cross detonation of the primacord trains was prevented by the sand fill 16. The lens 24 affects simultaneous ignition of the system of primacord trains 23 which in turn ignite the PBX–9404 explosive 22. The lens 24 is remotely initiated by means of a detonator cable 26.

The first test employed a cable support system consisting of six fifty-foot telephone poles (not shown) arranged symmetrically at a distance about the upper end 13 of the pit to suspend by cables 27 (see also FIG. 2) at least one test object 28 at a predetermined angle of attack to the cylindrical axis of the linear 11. In the experiment, four uninstrumented objects 29 and one instrumented cone 28 were suspended from the support system. (Reference to FIGURE 2 also represents this configuration.) To minimize interaction of the objects during their acceleration caused by the impinging supersonic flow, one end 31 of a soft wire 32, of approximately 275 lb. breaking strength, was attached to the object and the other end to a cross tube 33 laid across cables 27. The tubes 33 were prevented from slipping down cables 27 by washer stops 34 attached to the cables. The central test object 28 was instrumented to measure the effect of the explosion products upon it. Subsequent tests have used much simpler support systems.

The liners that have been used in conjunction within practicing the invention are varied. Initially concrete culvert pipe was employed, but it was found to be too fragile as it shattered rather extensively. Relatively thin wall mild steel pipe has been fund to be the most practicable.

In that experiment a vertically oriented concrete culvert pipe was used having the dimensions 60" I.D. x 5" wall x 12'0" long. The distance from the open end of the pit to the surface of high explosive was 10 feet. In other experiments a 60" I.D. x ¼" wall x 8'6" long vertically oriented steel pipe was used. The distance from the surface of the high explosive to the open end measured 8'1". Also a vertically oriented steel pipe having the dimensions of 6'0" I.D. x ¼" wall x 11' long was employed with the distance from the surface of the explosive to the open end of the pipe measuring 10'0". In experiments utilizing horizontal orientations, a pipe size of 30" O.D. x ⅜" wall x 10'0" long was used with the distance from the explosive surface to the open end measuring 10'0". These dimensions were selected based on the initial calculations involving Lagrangian equations descriptive of one-dimensional hydrodynamic flows. However, it is noted that widely varying dimensions and proportions could be substituted without departing from the teachings of the invention.

Flake TNT has been used as the high explosive in most of the experiments either by itself or coupled with another high explosive such as PBX–9404. Other explosives such as solid and liquid types could similarly be utilized in the present method. The explosive therefore need not be limited to powder explosives. The experiments conducted in the vertically oriented facility have used combinations of high explosives such as 331 lbs. of flake TNT over a ½-inch layer of 75 lbs. of PBX–9404, a high explosive produced by the Holston Army Ammunition Plant. Another experiment used simply 218 lbs. of the PBX–9404 type explosive. Still another used 531 lbs. of flake TNT. An experiment conducted in a horizontally oriented facility used a 28.5" diameter x 1.00" thick layer of pressed PBX–9404 glued to a ½" thick sheet of plywood. It is evident therefore that a wide variety of high explosives and combinations of high explosives of widely varying quantity and configuration can be employed in the present invention. In each case of the aforementioned experiments, the explosive thickness was chosen in a manner such that the calculated pressure profile 3 meters from the high explosive-air interface closely resembled a preselected planar profile having an average dynamic pressure peak of about 10,000 p.s.i. lasting for a duration of approximately 1 millisecond..

A variety of detonating means have also served equally well in igniting the explosives. One such is primacord, a train of low density PETN wrapped in a cotton sheath, used to initiate a ½" x ½" cylindrical Tetryl booster pellet disposed in contact with a layer of PBX–9404. The ends of the primacords are connected to a P–040 detonating lens. Alternatively, the large number of detonation points required to insure the generation of more or less planar flow can be ½" x ½" cylindrical Tetryl booster pellets as above. Other suitable detonating means also can be used.

In one vertically oriented experiment the test objects were suspended over the pit by means of the cable support system as described earlier. In other similar experiments less expensive suspensions systems were found to perform better. One of these consisted of utilizing an ingenious 3 point interdependent suspension system. This is shown by FIG. 3. Lowering jacks 41 can alter the distance between the surface of the explosive and the test objects. Support structure arm 42 extends from the lowering jack to another of the support arms 42' (see FIG. 3), and rests thereon. Support arm 42' in turn rests on a third support arm 42" which in turn rests on the initial support arm 42 thereby making an interdependent mutually supporting structure from which the test objects can be suspended. The support arms readily and independently free fly when impacted by a shock wave and do not interact with the test objects. A simple tripod arrangement has also been used successfully. Other type of supporting structure for the test objects could be employed so long as it meets the requirement of not affecting the reactions of the test objects during the subjection to the supersonic flow. In the experiments involving horizontal orientations, the test objects can be suspended in front of the cavity by wires or mounted in a projecting relation to the open end of a pit from a supported lance-like arm. In both cases the test object would be permitted to free fly.

The test objects can be instrumented to record various reactions to a supersonic flow by utilizing such sensors as accelerometers, strain gauges, displacement gauges, shock velocity gauges, time of arrival gauges, temperature gauges, density gauges, flow velocity gauges, as well as others depending on the type of monitoring required. Smoke pots or flares may also be attached to the test objects to aid visual observation of the resulting trajectories of the test objects. The test facility itself can be instrumented to measure various parameters, the most likely being the air shock velocity by means of gauges such as foil switches. Static and stagnation pressures could also be monitored.

The effects of the explosion products and the performance of the test facility can be measured and recorded by apparatus responsive to the signals generated by the instrumentation adapted to the test facility and test objects. It should be noted that the recording of the measuring instruments on the test objects only covers that period of time from the detonation of the explosive to the rupture of the instrumentation umbilical cords. Photographic recording of the trajectories of the free flying objects is also possible and has been done in some of the experiments utilizing the present invention. The points of impact are recorded and the objects recovered for examination. All the performance data is then compared with the predicted results.

As noted hereinbefore, the characteristics of the test facility can be predicted from the well known, one-dimensional, Lagrangian equations of hydrodynamic flow. Many calculations of flow properties have been made in accordance with widely known conventional practice.

Although one embodiment of the invention has been shown, this is merely illustrative and various modifications and alternatives can be made without departing from the spirit and scope thereof. It is to be understood, therefore, that this invention is not limited to the specific embodiments thereof except as encompassed in the following claims.

What is claimed is:

1. A supersonic test facility for testing the reaction of test objects to a relatively long duration supersonic flow of the order of one millisecond comprising,
   (a) a reinforced cavity of predetermined dimensions having one open end and one closed end,
   (b) an assembly including high explosive disposed across said closed end of said cavity, said high explosive having a preselected uniform thickness,
   (c) means for uniformly detonating said explosive across a transverse plane therein for generating a substantially planar supersonic detonation product flow, said detonating means and said explosive thickness selected together such that, on detonation of said explosive, a planar profile of said detonation product flow having a high pressure supersonic flow of the order of at least a millisecond duration is achieved at the open end of said cavity, and
   (d) means for positioning at least one object test in proximity to said open end of said cavity to be coincident with said preselected planar profile of said detonation product flow.

2. A supersonic test facility for testing the reaction of test objects to a relatively long duration supersonic flow comprising,
   (a) a section of cylindrical steel pipe disposed to form a liner in a pit bored in the earth, the cylindrical axis of said pipe vertically oriented, said pipe having a lower bottom end and open upper end and defining and elongated cavity, said upper end approximately level with the surface of the earth,
   (b) a uniform flat cylinder shaped layer of high explosive having a planar upper surface disposed on a solid base disposed adjacent the bottom end of said pipe, said explosive layer having a preselected uniform thickness,
   (c) multiple point detonating means arranged to ignite said explosive uniformly across said planar surface to generate a substantially planar shock wave and a supersonic detonation product flow which is directed along a unidirectional path longitudinally through said pipe, said detonating multiple point means selected together with said explosive layer thickness and arranged such that, on detonation of said explosive, a planar profile of said detonation product flow having a high pressure of at least approximately 10,000 pounds per square inch and supersonic flow of the order of a millisecond duration is achieved at the open upper end of said pipe,
   (d) a breakaway support system for suspending at least one test object above said upper end at a predetermined angle of attack to the cylindrical axis of said pipe and in spatial communication with said high explosive upper surface; and
   (e) at least one test object depending from said support system to be coincident with said planar profile of said detonation product flow, said object instrumented to detect and record the reaction of said object to impinging supersonic detonation product flow.

3. A supersonic test facility for testing the reaction of test objects to a supersonic flow comprising,
   (a) a uniform diameter cylindrical liner of ductile material defining an elongated cavity,
   (b) inertial backing material disposed about said liner,
   (c) explosive assembly means for generating a planar supersonic flow of detonation products disposed transversely in said cavity, said explosive assembly means comprising explosive material having a preselected thickness transverse to said elongated cavity and a multiplicity of detonating point means, said explosive thickness and said multiplicity of detonating point means selected together to achieve, on detonation of said explosive material, a planar profile of said detonation product flow having a high pressure of approximately 10,000 p.s.i. and supersonic flow of the order of a millisecond duration at a preselected point along said elongated cavity,
   (d) inertial backing material disposed in proximity to one side of said assembly to direct the detonation to flow longitudinally through said cavity, and
   (e) means for suspending a test object in the flow of said detonation at said preselected point along said elongated cavity.

References Cited by the Examiner

UNITED STATES PATENTS

| | | | |
|---|---|---|---|
| 2,824,444 | 2/1958 | Hanes | 73—12 |
| 2,832,213 | 4/1958 | Cole et al. | 73—35 |
| 3,184,097 | 5/1965 | Kilmer et al. | 73—147 X |
| 3,184,955 | 5/1965 | Filler | 73—12 X |

OTHER REFERENCES

Industrial Laboratories, February, 1958, pages 6–9, "The Shock Tube."

I. S. A. Journal, August 1960, pages 62–66, article by Harris et al.

DAVID SCHONBERG, *Primary Examiner.*